United States Patent [19]

Leitner

[11] 4,104,951

[45] Aug. 8, 1978

[54] FIXING STUD FOR JOINING BUILDING OR CONSTRUCTIONAL ELEMENTS

[76] Inventor: Kajetan Leitner, Öschweg 44, Eislingen, Fed. Rep. of Germany, 7332

[21] Appl. No.: 722,815

[22] Filed: Sep. 13, 1976

[30] Foreign Application Priority Data

Sep. 15, 1975 [DE] Fed. Rep. of Germany ....... 2541105

[51] Int. Cl.² .............................................. F16B 5/00
[52] U.S. Cl. ..................................... 85/5 R; 24/73 P; 85/8.1; 85/72; 403/409
[58] Field of Search .................. 85/1 S, 5 R, 5 N, 8.1, 85/8.3, 79, 72, 86, 87, 82, 84, 23, 83; 403/2, 409; 24/73 P, 73 PF, 73 HS, 73 PM, 73 D; 151/8, 23, 67, 57

[56] References Cited

U.S. PATENT DOCUMENTS

| | | | |
|---|---|---|---|
| 100,055 | 2/1870 | Montgomery | 85/79 |
| 1,106,767 | 8/1914 | Young | 85/23 |
| 1,123,053 | 12/1914 | Wilcoxson | 85/1 S |
| 1,215,259 | 2/1917 | Draper et al. | 85/23 |
| 1,695,113 | 12/1928 | Langton et al. | 85/8.1 |
| 2,238,463 | 4/1941 | Dubilier | 85/8.1 |
| 2,593,790 | 4/1952 | Pietzsch | 85/5 N |
| 3,116,528 | 1/1964 | Poe | 85/84 |
| 3,518,915 | 7/1970 | Gutshall | 85/72 |
| 3,722,932 | 3/1973 | Dougall | 85/8.3 |
| 3,916,755 | 11/1975 | Pestka | 85/5 R |
| 3,974,621 | 8/1976 | Stang | 85/79 |

FOREIGN PATENT DOCUMENTS

2,266,039 10/1975 France ........................................ 85/79
839,089 6/1960 United Kingdom.

*Primary Examiner*—Marion Parsons, Jr.
*Attorney, Agent, or Firm*—O'Brien and Marks

[57] ABSTRACT

A stud which, by being inserted through holes in structural or like building members, joins them together, includes two parts which can be moved relatively over contacting, planar side surfaces, at least one of the parts having lateral facing portions for embracing the members to hold them together, and the stud parts being held together after insertion through the holes by releasable, and preferably resilient, means allowing, after release, removal of the stud from the holes.

5 Claims, 16 Drawing Figures

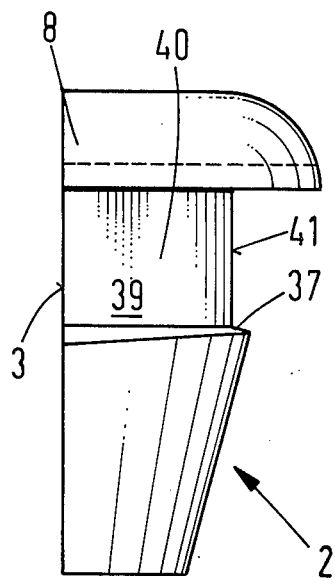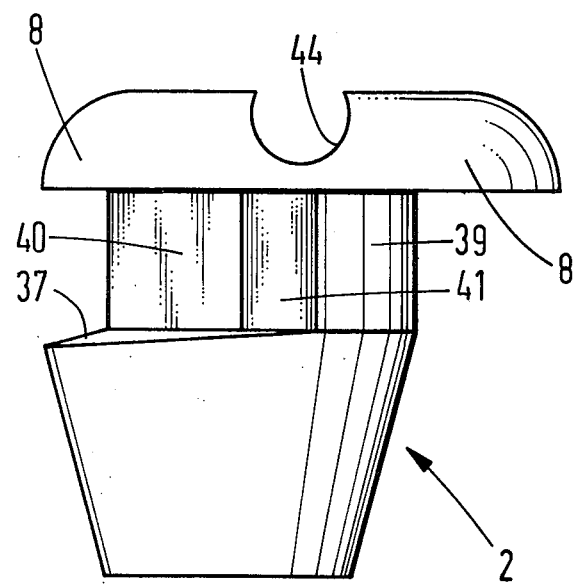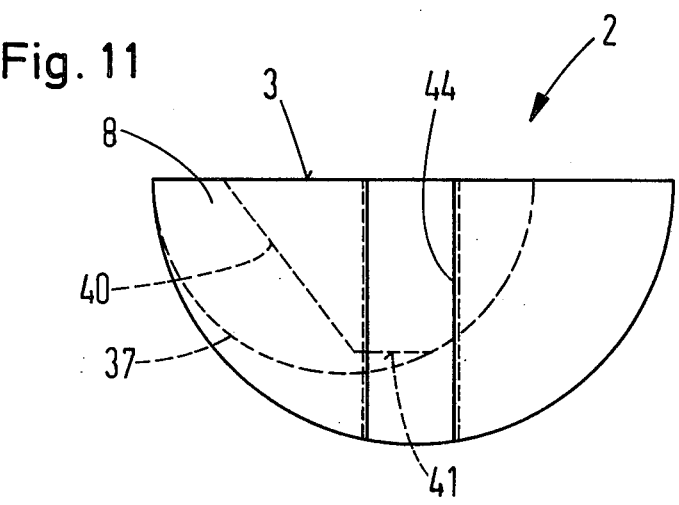

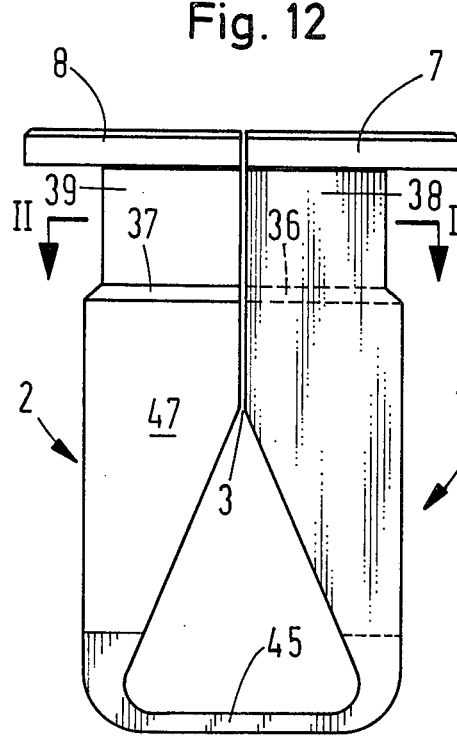
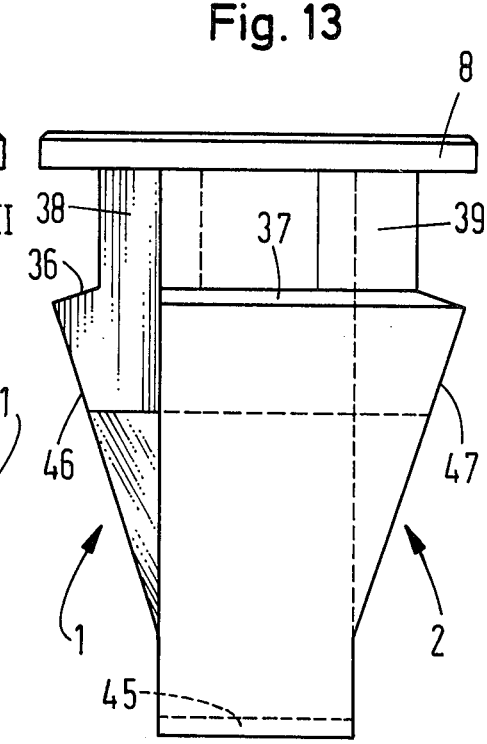
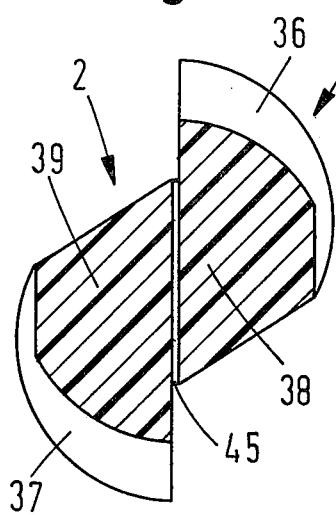
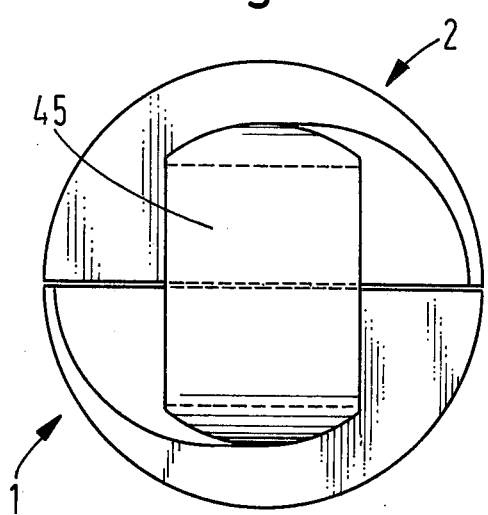

FIXING STUD FOR JOINING BUILDING OR CONSTRUCTIONAL ELEMENTS

DESCRIPTION

The invention relates to a fixing stud or fastening for releasably joining building or constructional elements with aligned substantially equal-sized round holes, through which the fixing elements is pushed from one side and may also be withdrawn from the one side.

Such fixing studs have hitherto had a "snap" action being so arranged that resilient projections are pressed inwardly during insertion and, when completely inserted, spring back outwardly thereby to locate themselves behind the edge of the hole in the building or constructional element in question. The projections have oblique surfaces facilitating both insertion and withdrawal of the stud. As the projections of such fixing studs can only have a relatively short resilient displacement, they are not capable of resisting very heavy loads, and the oblique surfaces for facilitating withdrawal make it easy for connected building or structural elements to be ripped apart accidentally.

The object of the invention is to provide such fixing studs of simple construction capable of withstanding greater separating loads.

According to this invention, a stud for joining building or constructional elements by being inserted through aligned holes in the elements is formed in two parts, each said part having a neck for extending through the holes and at one end of the neck a stop extending laterally from the neck for limiting the extent to which the neck may project through the holes, said stud parts having longitudinally extending planar side surfaces enabling the stud parts to be displaced relatively with the axially-extending surfaces in contact, at least one of said stud parts having on its neck a lateral projection on the side of the neck remote from its planar side surface and spaced axially from the stop, the lateral projection having a surface facing the stop, and releasable, and conveniently resilient, means for retaining the stud parts together when inserted in the aligned holes.

Since the stud parts are displaceable relatively over the planar side surfaces, the stud can be easily inserted into round holes and then positioned with the lateral projection or projections located behind the edge of the hole of the appropriate building or constructional element. Also the lateral projections do not require oblique surfaces facilitating their release, so that ripping apart of the building or constructional elements is not possible without destroying the stud. For releasing the stud it is only necessary to render the resilient means ineffective, whereafter the two stud parts can again be moved relatively to permit their withdrawal. The resilient means can be such as not to be stressed by the forces acting on the building or constructional elements, as these forces are absorbed by the lateral projections or stops, which transmit these forces to the necks whose cross-section finally determines the loading capacity of the fixing element.

The resilient means in one form includes a groove on one part and a rib fitting this, on the other part, the groove and a rib allowing axial relative movement of the stud parts by having oblique surfaces facilitating snap engagement and disengagement, only the part having the rib being in this case provided with a lateral projection. The rib and groove are conveniently at a position remote from the stops and at a distance from the building or constructional element. This construction relies on a certain amount of elasticity of the stud parts where they project beyond the holes. When inserting such a stud, the part with the lateral projection is first inserted and then the other part is pushed in until the rib snaps into the groove. If only a small height of the stud element is required on the insertion side the rib and groove are preferably disposed in the leading end of the necks considered in the direction of insertion, where in general the length of the stud projecting beyond the building elements does not play any part and accordingly the desired elasticity can be attained over this length.

For releasing the stud, preferably the part not provided with the lateral projection may have at its stop end an overhung recess directed away from the other part so that a lever can be inserted in the recess and by using the other part as a fulcrum can apply sufficient pressure to disconnect the rib from the groove.

The resilient means can also advantageously be a spring clip held by the stud part having the lateral projection, the clip bearing against the other part and exerting on the first part a tractional force acting oppositely to the insertion direction. Because of the action of the spring clip, the lateral projection on the one stud part and the stop on the other stud part are pressed against the relevant building or constructional elements, by which the stud produces a clearance-free or play-free connection and is thus also in a position to accommodate to an extent dimensional tolerances of the building or constructional elements.

It is possible for the stud to be so designed that each of its two parts has a lateral projection, by which the loading capacity of the stud is correspondingly increased. With such a stud, the axially-extending surfaces are such as to allow transverse relative movement parallel to the surfaces, and the two lateral projections are directed oppositely. For inserting the stud the necks of the two parts may be brought into coincidence by such transverse parallel displacement equal to the height of the lateral projections, thus allowing their necks to be insertable into the holes, and then by opposite transverse displacement the lateral projections are engaged with the edges of the holes to grip the constructional elements. The plane axially-extending surfaces, by allowing such transverse relative movement of the two parts, permit the two parts to be pushed together through the holes. The building or constructional elements are thereby particularly securely held together on the one hand by the two stops on one side of the parts and the two lateral projections on the other side.

With this form of stud, the resilient means may be a bridge inset into the stops to hold them against separation. The bridge may be a pin snap-fitted between resilient lips of channels in the stops.

Alternatively the resilient means may be an elastic connecting web joining the stud parts at their ends remote from the stops, the web being such that, when stressed, it urges the two parts in the sense of engaging their lateral projections parallel with the edges of the holes. The lateral projections may in this case have a slight obliquity making possible easy insertion. Since the stud parts are connected together a part cannot be lost. This form of stud is also particularly rapidly assembled because the oblique surfaces on the lateral projections make it easy to press the stud through the holes.

Some embodiments of the invention are shown by way of example on the accompanying drawings in which.

Figure 1:
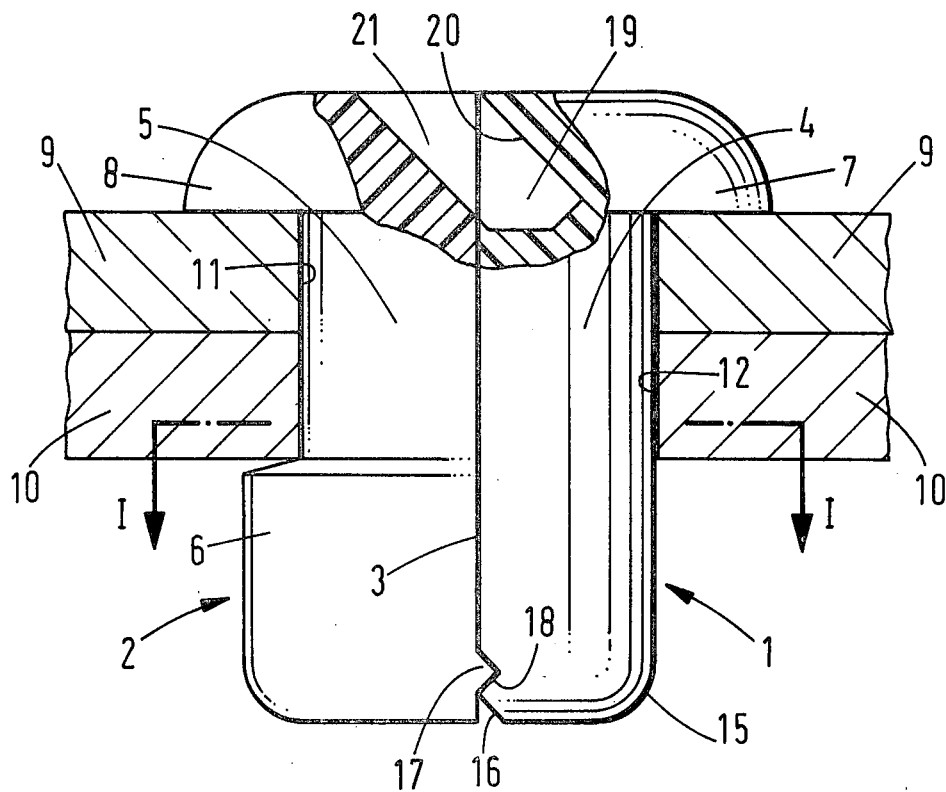
FIG. 1 shows a fixing stud joining two constructional elements.
Figure 7:
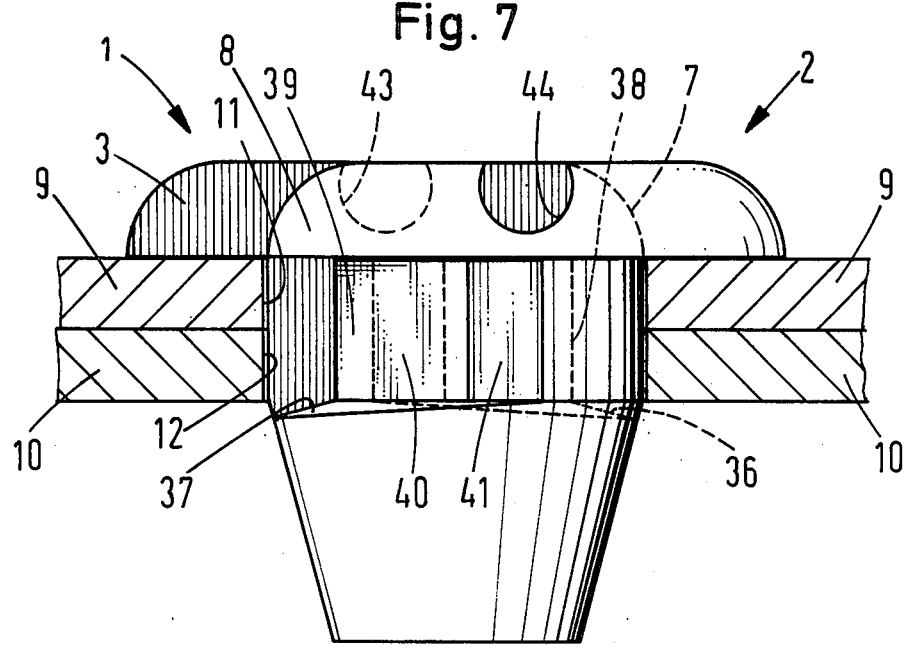
Figure 8:
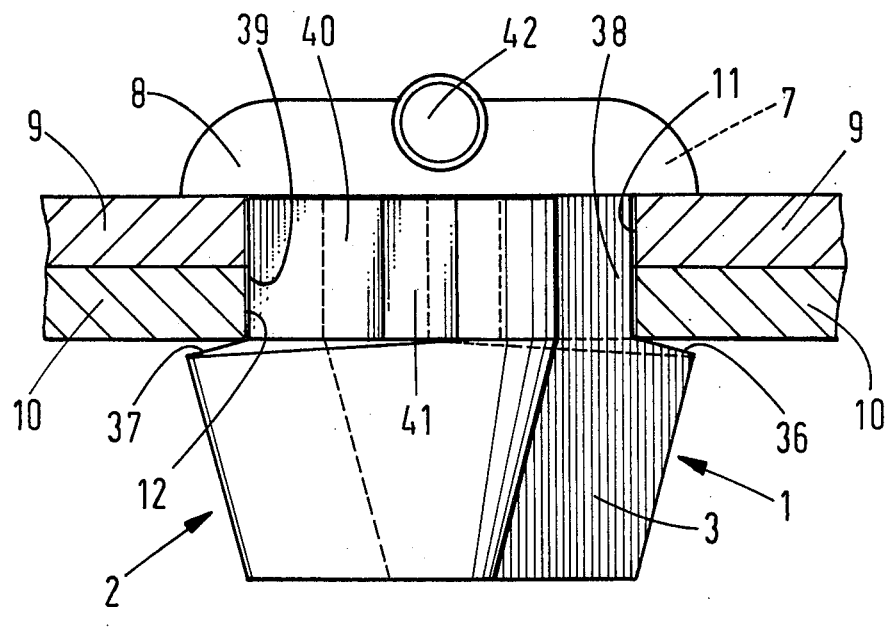
Figure 16:
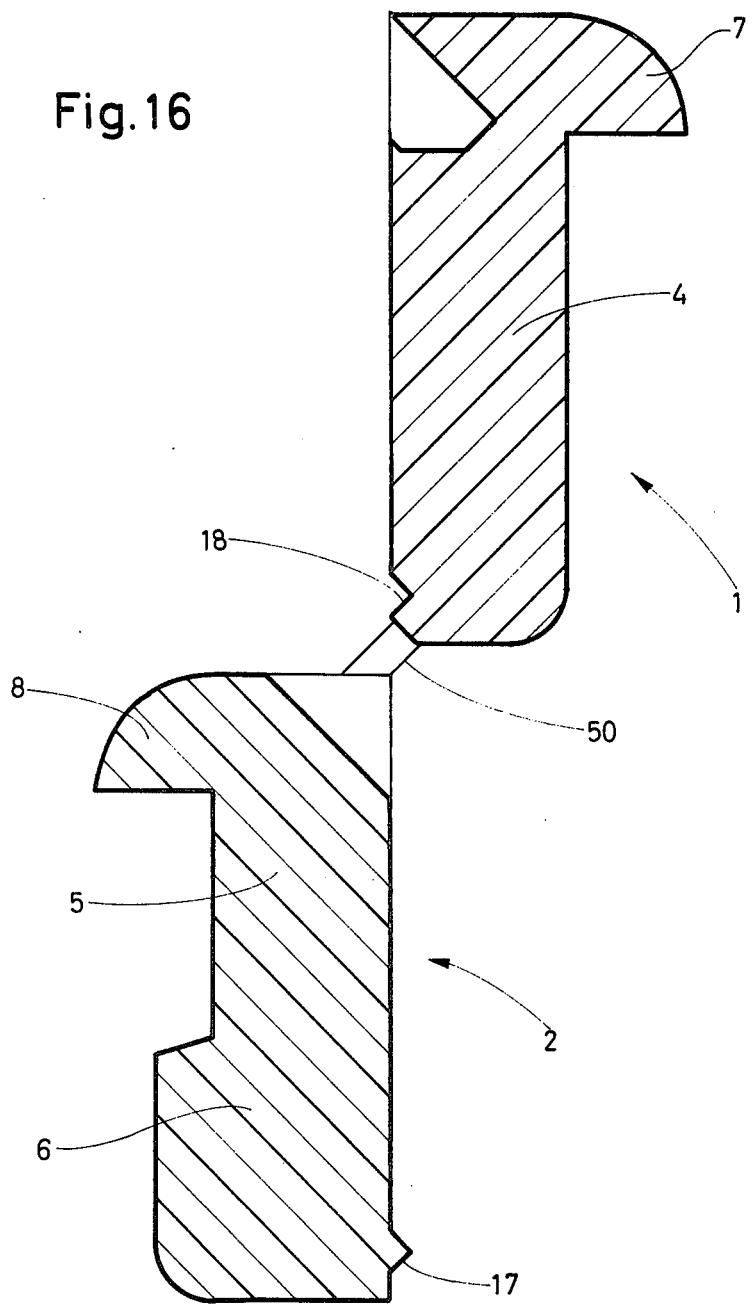

FIG. 7 shows another form of fixing stud partly inserted through holes in elements to be connected, FIG. 8 shows the stud of FIG. 7 fully inserted, FIG. 9 is a side elevation of one part of the stud of FIGS. 7 and 8, FIG. 10 shows the same part turned through 90°, FIG. 11 is a plan view from above of the same part, FIG. 12 shows yet another form of fixing stud, FIG. 13 shows the same fixing stud turned through 90°, FIG. 14 is an under plan of FIG. 13, FIG. 15 is a section on the line II—II of FIG. 12, and FIG. 16 shows the fixing stud of FIG. 1 in section as a dependent spray or injection component.

The fixing stud or fastening shown in FIG. 1 is in two parts 1 and 2 which fit against one another along longitudinally extending planar side surfaces 3. Each of the parts 1, 2 has between its ends a neck of semi-circular cross-section. Neck 4 of the part 1 is semi-circular in cross-section substantially over the whole length of the part 1. The part 2 however has at its front end, considered in the direction in which it is inserted through round holes 11, 12 in the construction elements 9, 10, a lateral projection 6 on its side remote from the surface 3, the projection having a radial surface facing the overhanging portion of the stop 8. At the rearward end each of the parts 1, 2 has a flange-like stop 7, 8 respectively. When inserted through the holes 11, 12, the fixing element connects the two flat plate-like or panel type building or constructional elements 9 and 10, the neck 5 being of such a length that the elements 9 and 10 are gripped or engaged between the facing surfaces of the projection 6 and stop 8.

To effect the connection, the part 2 is inserted through holes 11 and 12 and then displaced laterally to the position of FIG. 1. Insertion can be effected, because the part 2 is provided with inwardly directed flats 13, 14 extending from the maximum width portions of the neck 5 and projection 6 to the flat surface 3, thus allowing the part 2 to be displaced so far to the right in the holes 11, 12 that the projection 6 can pass through the round holes 11 and 12. The slightly bevelled top surface of the projection assists lateral displacement of the part 2 into the position represented in FIG. 1.

Part 1 is now inserted through holes 9 and 10, the curvature 15 at the leading end of the neck 4 facilitating insertion. This operation presses part 2 against the walls of the holes 9, 10 ensuring its proper seating. With the continuing insertion of part 1, a bevel 16 at its leading end contacts the upper side of the wedge-sectioned transverse rib 17 on the part 2 and finally due to slight elasticity in the parts snaps past the rib 17 which then enters a correspondingly-shaped groove 18 in the part 1. The parts are thus retained against accidental withdrawal from the holes.

To allow withdrawal of the fixing stud, part 1 is formed with a recess 19 extending downwardly away from part 2 and below an overhand 20 and part 2 has a notch 21 leading to the recess 19. Thus a lever can be inserted in the recess 19 and by bearing in the notch as a fulcrum, the lever can exert pressure on the overhang 20 sufficient to allow the end of part 1 to snap over the rib 17 to release the part allowing its withdrawal from the holes, after which part 1 can be drawn without difficulty out of the round holes 11 and 12. After this part 2 can also be withdrawn from the holes.

Figure 2:
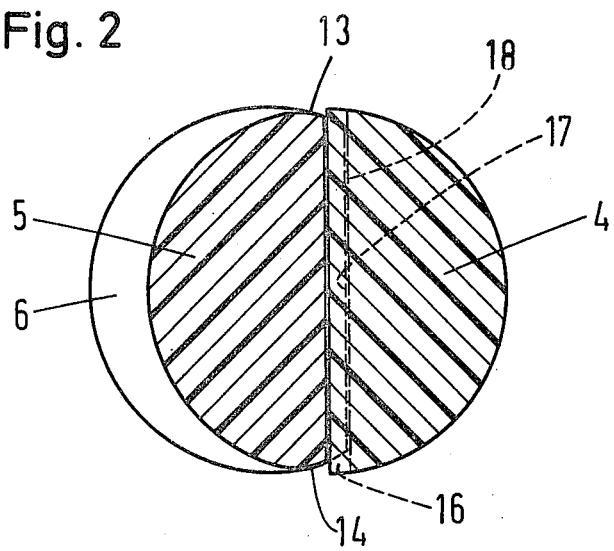
FIG. 2 is a section of the line I—I of FIG. 1.
Figure 3:
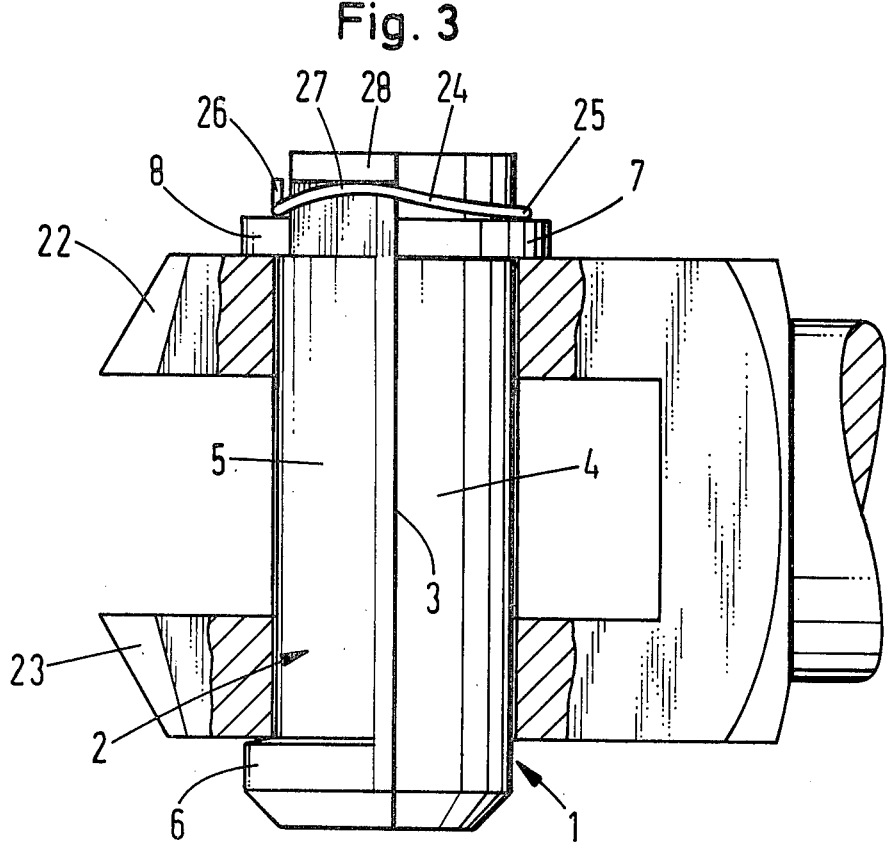
FIG. 3 shows another fixing stud.

The fixing stud shown in FIG. 3 has in respect of its neck and the projection the same construction in principle as the fixing stud of FIGS. 1 and 2. The stud of FIG. 3 serves to connect the two tines 22, 23 of a forked head on a building or constructional element and to act as a spindle for a further building or construction element not shown.

In order now to connect stud parts 1 and 2 so as to be free from play when fitted to the tines 22, 23 and therefore free from rattling, a split spring clip 24 is provided to connect the parts 1, 2. The spring clip 24 is annular (see FIG. 4), bears by one side 25 against the stop 7 of part 1 and has its ends 26 on its opposite side bearing on the stop 8 of part 2. The clip 24 has relatively tight convexities 27 adjacent its ends 26, which convexities 27 engage in undercut shoulders 28, 29, which project radially out of part 2. The spring 24 is prestressed such that it tends to draw part 2 against pat 1, such that stop 7 of part 1 is firmly pressed against the tine 22 and such that stop 6 of part 2 is firmly pulled against the tine 23.

This arrangement compensates for tolerances in the spacing of the tines 22, and produces a rattle-free seating of the fixing stud in the fork head.

It should be pointed out that with the fixing stud of FIG. 3 the stop 8 may not contact tine 22 when the spring 24 is stressed.

Figure 4:
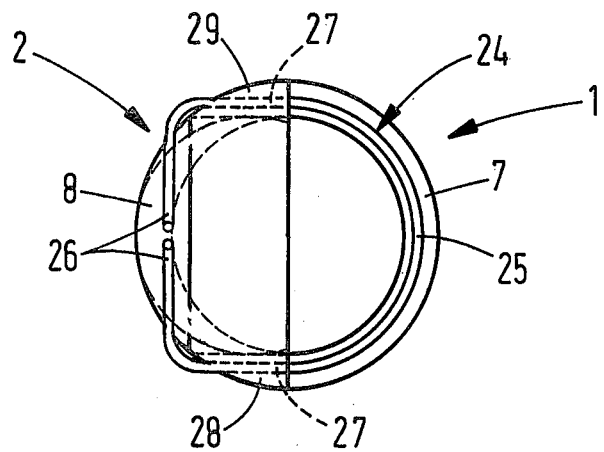
FIG. 4 is a plan view from above of this fixing element.

As can be seen from FIG. 4, the ends 26 of the clip 24 grip the stop 8 beyond the shoulders 28, 29 whereby the clip 24 is retained in position and by bearing on the stop 7 assists to prevent any tendency of the parts 1 and 2 to move relatively axially.

Figure 5:
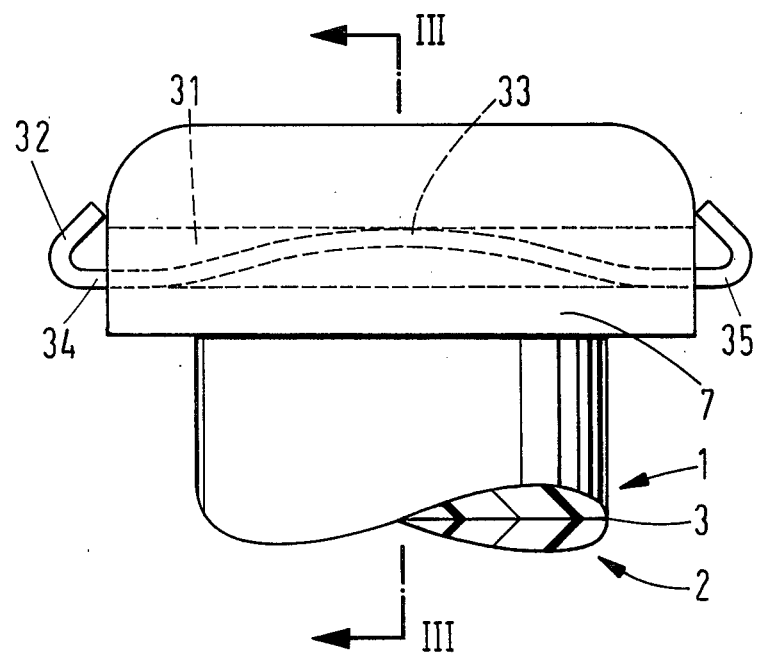
FIG. 5 shows a modification.
Figure 6:
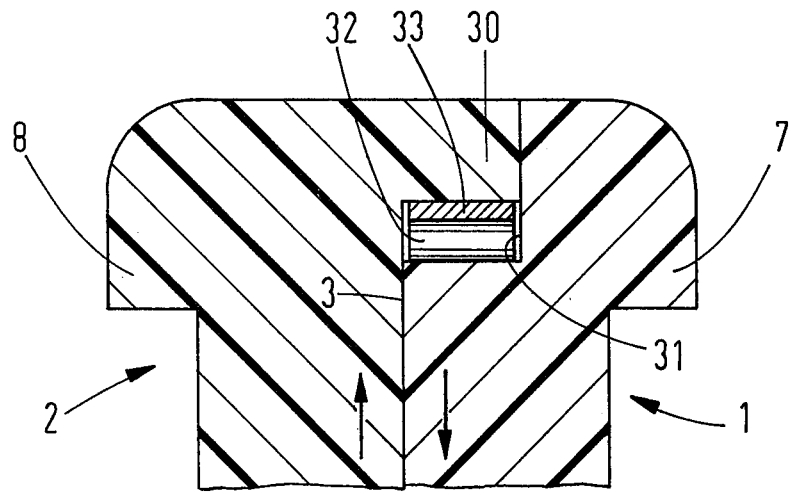
FIG. 6 is a section on the line III—III of FIG. 5.

In FIGS. 5 and 6 another form of spring clip is shown for use with a fixing stud which, apart from the holding arrangement for the spring, is designed similarly to that of FIG. 3. In FIGS. 5 and 6 therefore only the stud parts comprising the stops 7 and 8 are shown. As can be seen the stop 7 has a rebate providing a shoulder 31 set back from surface 3, and the stop 8 has a flange 30 extending to the shoulder 31 in such manner that there is formed a channel of rectangular cross-section. The channel accommodates a spring clip 32 which presses by its mid length convexity 33 against the flange 30 and by its ends 34 and 35 on part 1. In this way the parts 1, 2 are urged in the direction of the arrows on FIG. 6 giving the same effect as with the spring clip of FIG. 3.

The fixing stud shown in FIGS. 7 to 11 is formed by parts 1 and 2 which are identical. The parts have necks 38, 39 respectively which are basically semi-cylindrical with an end shaped as a semi-frustum of a cone, the semi-cylindrical portion being cut away to leave flat surfaces 40, 41 extending from a side projection 36 or 37 to the stop 7 or 8.

The stops 7, 8 are semi-circular in plan (see FIG. 11) and offset from the respective necks 38, 39 in a direction parallel to the plane mating surfaces 3 as will best be seen in FIG. 11. This permits displacement of parts 1, 2 parallel to their contacting surfaces 3, so that parts 1, 2 can assume either of the positions represented in FIGS. 7 and 8. With the parts as in FIG. 7, that is with the plane surfaces 3 of the necks coincident, the parts may be inserted through the holes 11, 12. They may then be displaced parallel to the surfaces 3, to positions (FIG. 8) in which the projections 36, 37 grippingly engage the structural elements to retain them together. In the position of FIG. 8, the necks 38, 39 are offset but the stops 7, 8 are coincident. The parts are retained in this position by a bridging pin 42 which is received in channels 43, 44 in the stops, the channels having a section which is an arc of a circle greater than a semicircle so as to retain the pin. The pin can be snapped into the channels past the overhanging lips of the channels.

In FIGS. 12 to 15 there is shown a variant of the stud of FIGS. 7 to 11. In this form, the parts 1, 2 are joined together by an elastic web 45 which tends to maintain the parts 1, 2 in the position of FIG. 13. To insert the fixing stud of FIGS. 13 to 15 the contacting surfaces of the necks 38, 39 are brought into coincidence by pressing oblique surfaces 46 and 47 on the parts towards one another thus allowing the necks to be pushed together through holes in the structural elements until the projections 36, 37 clear the holes. On release of pressure on the surfaces 46, 47 the web 45, which has been twisted and thereby stressed, returns the parts 1 and 2 to the position of FIGS. 12 to 15 so that the projections 36 and 37 engage behind the perimeters of the holes to retain the structural elements together.

The forms of fixing studs described above can advantageously be injection-moulded from plastics material, but in some cases of a special loading for example when the stud forms spindle as in FIGS. 3 and 4, parts 1 and 2 are preferably made of steel.

When the stud is to be of plastics material it is possible to injection mould the studs (of FIGS. 1 and 2 for example) with its parts 1 and 2 joined by a skin 50. The parts 1, 2 may be interconnected as shown so that one part is disposed to a certain extent behind the other with their plane contacting surfaces substantially aligned, whereby the part 2 can be inserted in the holes first whilst part 1 is still attached by the skin 50 and then the part 1 is pushed through the holes in the manner described above so tearing the skin to separate the parts.

FIG. 16 shows in section the parts of a stud of FIG. 1 before insertion and thus still joined by skin 50.

I claim:

1. In a fastener assembly, the combination comprising:
   a releasable fastening for insertion through aligned openings in plate-like structural elements from only a front-side of the elements and for securing the elements together;
   first and second parts each having a length forming a front portion for projecting from a rear side of the elements, a neck portion for extending through the aligned openings, and a rear portion for projecting from a front side of the elements;
   said front portion and said neck portion of the first part having cross sections permitting insertion of the first part into the aligned openings;
   said rear portions of the first and second parts each including a laterally extending stop for engaging the front side of the elements;
   said front portion of the first part including a laterally extending projection for engaging the rear side of the elements when the first part is in an engaging position;
   said cross section of the neck portion of the first part being reduced relative to the cross section of the front portion of the first part for allowing lateral displacement of the first part to move the first part into the engaging position;
   said first and second parts having mating side surfaces extending rectilinearly along their lengths to permit relative sliding movement of the first and second parts,
   said front portion of the second part including a locking indentation in the side surface of the second part spaced from the neck portion of the second part for mating with the locking projection when said stop on the rear portion of the second part engages the front side of the elements whereby the first and second parts are releasably locked together without tension when the neck portions of the first and second parts are in the aligned openings;
   said locking projection and said locking indentation cooperating with each other to retain the two parts in fixed longitudinal relationship defined by the laterally extending stops of the rear portions engaging the front side of the elements and the laterally extending stop on the front portion engaging the rear side of the elements; and
   said two parts being in said fixed longitudinal relationship without lateral expansion of said two parts when the locking projection is mated with the locking indentation.

2. The invention according to claim 1 wherein said side surfaces are planar surfaces.

3. The invention according to claim 1 wherein said locking projection is a transversely-oriented raised rib on the side surface of the first part and the locking indentation is a corresponding transverse groove on the side surface of the second part.

4. The invention according to claim 3, said second part having an overhung recess for engagement by a lever for releasing said rib from said groove.

5. The invention according to claim 1 wherein said parts are connected together end to end by a tearable connecting skin, the side surfaces being substantially in alignment.

* * * * *